(12) United States Patent
Seow

(10) Patent No.: US 6,298,223 B1
(45) Date of Patent: Oct. 2, 2001

(54) DETECTOR CIRCUIT AND METHOD OF DETECTING ANTENNA MISMATCH

(75) Inventor: Boon Eu Seow, Bayan Baru (MY)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/304,383

(22) Filed: May 4, 1999

(51) Int. Cl.[7] .................................................. H01Q 11/12
(52) U.S. Cl. ......................... 455/129; 455/117; 455/127; 330/298
(58) Field of Search .................................. 455/127, 121, 455/117, 115, 91, 129; 330/278, 282, 284, 298

(56) References Cited

U.S. PATENT DOCUMENTS 4,439,741 * 3/1984 Turner, Jr. ................................ 455/63
4,580,092 * 4/1986 Squire .................................... 324/646

* cited by examiner

Primary Examiner—Doris H. To
(74) Attorney, Agent, or Firm—Scott M. Garrett

(57) ABSTRACT

A detector circuit (1) includes a coupler (2) having a primary port (10) and a reflector port (11). The primary port (10) has an input node for receiving radio frequency signals from an amplifier (7) and an output node coupled to an antenna port (ANT). There is a rectification circuit (3) having an input coupled to the reflector port (2) and a low pass filter (4) is coupled to an output of the rectification circuit (3). The detector circuit also includes a comparator (5) having a reference input (Vref) and a signal input (Vin). The reference input (Vref) is set to a voltage threshold level and the signal input is coupled to an output of the low pass filter (4). In use signals at an output of the comparator (5) are indicative of a missing or mismatched antenna coupled to the antenna port (ANT).

10 Claims, 2 Drawing Sheets

DETECTOR CIRCUIT AND METHOD OF DETECTING ANTENNA MISMATCH

FIELD OF THE INVENTION

This invention relates to a detector circuit and method of detecting antenna mismatch.

BACKGROUND ART

Conventional portable two-way radios usually have an antenna port to which an antenna is removably coupled. If an incorrect or damaged antenna is coupled to the port then undesirable relatively large standing waves will result. These standing waves are due to mismatch between the antenna and power amplifier circuitry inside the two-way radio. Unfortunately, these standing waves affect the performance of the radio and can cause damage to the amplifier circuitry. Accordingly, upon detection of mismatch, conventional radios will reduce the amplifier circuitry's output power to decrease current drain. However, this can still cause damage to the amplifier circuitry especially if unduly large standing waves are created by mismatch.

SUMMARY OF THE INVENTION

It is an aim of this invention to overcome or alleviate at least one of the problems associated with detecting antenna mismatch.

According to one aspect of the invention there is provided a detector circuit for detecting antenna mismatch, the circuit comprising:

a coupler having at least one primary port and at least one reflector port, said primary port having an input node for receiving radio frequency signals from an amplifier and said primary port also having an output node coupled to an antenna port;
  a rectification circuit having an input coupled to said reflector port;
  a low pass filter coupled to an output of said rectification circuit; and
  a comparator having a reference input, a signal input and comparator output, said reference input being set to a voltage threshold level and said signal input being coupled to an output of said low pass filter,
  wherein in use signals at said comparator output are indicative of a missing or mismatched antenna coupled to said antenna port.

Preferably, said rectification circuit may include a direct current amplifier.

Suitably, said rectification circuit may comprise at least two diodes and at least two capacitors, one of said capacitors being in series with said diodes and the other of said capacitors being coupled to ground.

Preferably said rectification circuit may be a voltage doubler.

Suitably, said comparator output may be coupled to a controller.

Preferably said controller may have an amplifier control output for controlling said amplifier, wherein said amplifier control output disables said amplifier when a signal indicative of antenna mismatch is provided at the output of said comparator.

Suitably, said controller may be a microprocessor.

Preferably, said coupler may be a transformer. In an alternative form said coupler may be a strip line coupler.

Suitably said primary port may comprise at least part of a transmission line.

According to another aspect of the invention there is provided a method for detecting antenna mismatch, the method comprising the steps of:

supplying alternating current signals from a reflector port of a coupler, said coupler having a primary port with an input node coupled to an amplifier and said primary port also having an output node coupled to an antenna port;
  rectifying said alternating current signals to provide a rectified signal;
  low pass filtering said rectified signal to provide a direct current voltage; and
  comparing a voltage level of said direct current voltage with voltage threshold level to provide a signal indicative of a missing or mismatched antenna coupled to said antenna port.

Preferably, said step of rectifying further includes the step of amplifying said rectified signal.

Preferably said method may be further characterised by the step of:

disabling said amplifier when a signal indicative of antenna mismatch is provided.

BRIEF DESCRIPTION OF THE DRAWINGS

In order that the invention may be readily understood and put into practical effect, reference will now be made to preferred embodiments in which.

DETAILED DESCRIPTION OF THE PREFERRED EMBODIMENTS OF THE INVENTION

Figure 1:
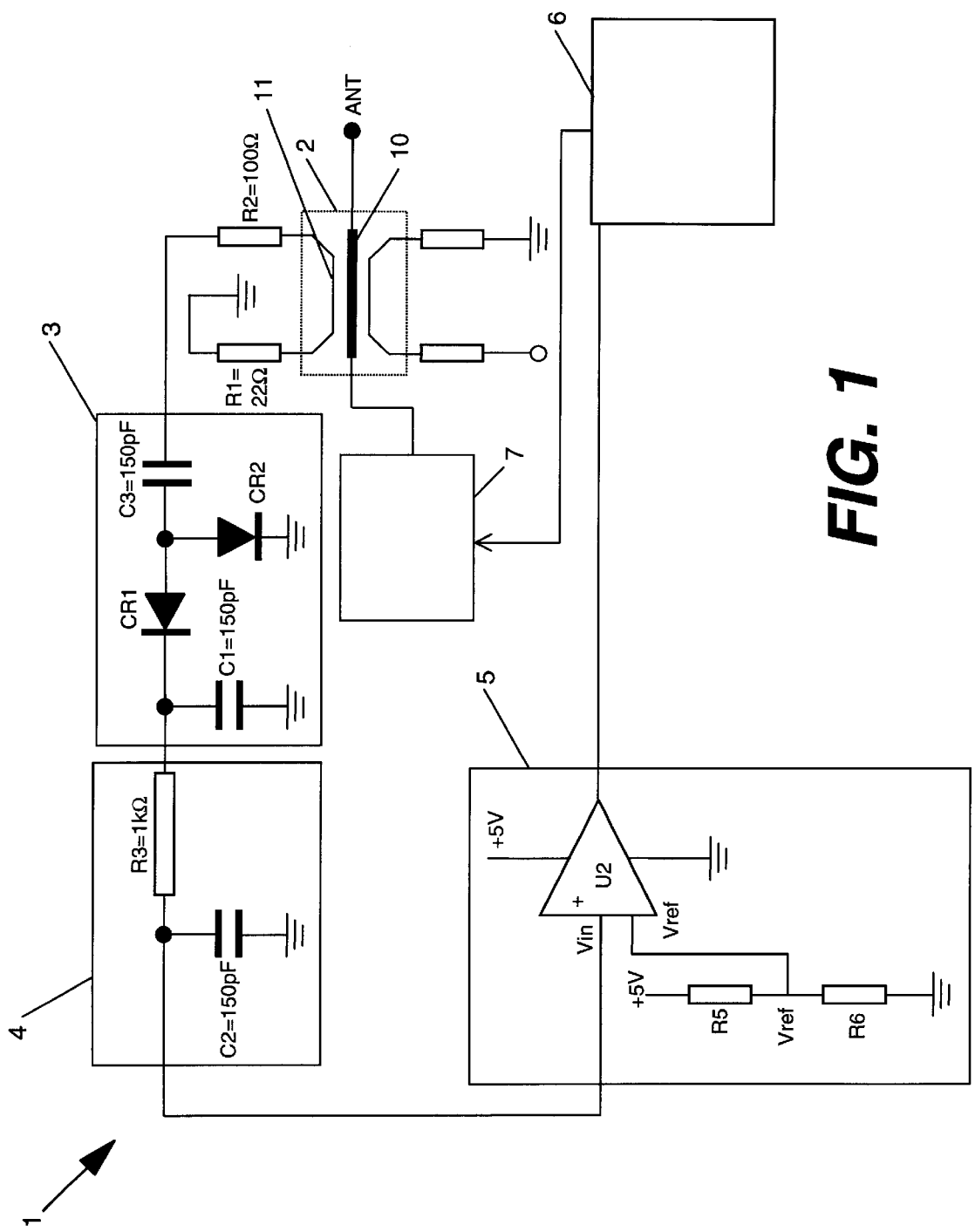
FIG. 1 is a preferred embodiment of a schematic diagram of a detector circuit for detecting antenna mismatch in accordance with the present invention.

Referring to FIG. 1 there is illustrated a detector circuit 1 for detecting antenna mismatch. The detector circuit 1 includes a coupler 2 in the form of a strip line with a primary port 10 and reflector port 11. There is also a rectification circuit 3 having an input coupled to the reflector port 11 and an output coupled to a low pass filter 4. The detector circuit 1 also has a comparator 5 with a reference input Vref set to a voltage threshold level by a tapping between two series resistors R5,R6 connected between 5 volts and ground. The comparator 5 has a signal input Vin coupled to an output of the low pass filter 4 and a comparator output OP is coupled to an input of a microprocessor 6. The microprocessor 6 has an amplifier control output coupled to a control input of a radio frequency power amplifier 7 that has an output coupled to an input of the primary port 10. The output of the primary port is coupled to an antenna port ANT.

The rectification circuit 3 is a voltage doubler with two diodes CR1, CR2 and two capacitors C3, C1. Accordingly, the rectification circuit has a dual purpose of rectifying and amplifying. One of the capacitors C3 is in series with the diodes CR1, CR2 and the other of the capacitors C1 is coupled to ground. The low pass filter 4 is a conventional filter and includes a series resistor R3 and a capacitor C2 coupled to ground. Finally, reflector port has a resistor R1 coupled to ground and a series resistor R2 providing coupling to rectification circuit 3.

As will be apparent to a person skilled in the art, the primary port 10 is basically a transmission line. Accordingly, in use, if there is a mismatched, damaged or missing antenna at the antenna port ANT, increased standing waves will result. These increased standing waves will be detected by reflector port 11 and therefore increase alternating current signals will be supplied to the rectification circuit 3. These alternating current signals are rectified and amplified by the voltage doubling effects of rectification circuit 3. The low pass filter 4 removes high frequency noise superimposed on the rectified and amplified signal thereby providing a processed direct current voltage to the signal input Vin of the comparitor 5. If the voltage level of the direct current voltage at the signal input Vin is above the voltage threshold level at the reference input Vref, then the signal at the output of the comparitor is indicative of a missing or mismatched antenna. Accordingly, microprocessor 6 sends a control signal to disable power amplifier 7 and therefore the standing waves cease and amplifier damage by mismatch will not occur. The microprocessor 6, will also send a signal to a display (not shown) so that a user can be informed that the amplifier 7 has been disabled due to the missing or mismatched antenna.

Figure 2:
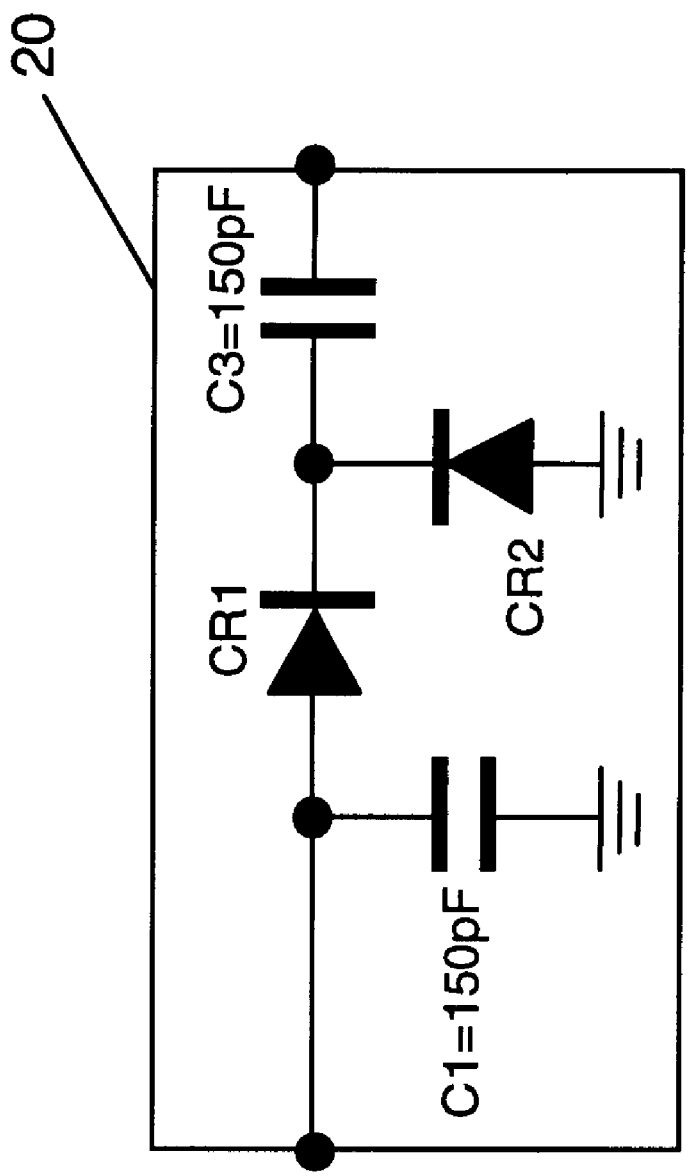
FIG. 2 is an alternative preferred embodiment of a voltage doubler circuit used in FIG. 1.

Referring to FIG. 2 there is illustrated a second embodiment of a rectification circuit 20 in which the diodes CR1, CR2 have been reversed in polarity. If this rectification circuit 20 is used then an inverting amplifier would need to be inserted between the low pass filter and comparitor.

Although the invention has been described with reference to preferred embodiments, it is to be understood that the invention is not necessarily limited to the embodiments described herein.

What is claimed is:

1. A detector circuit for detecting antenna mismatch, the circuit comprising:

a coupler having at least one primary port and at least one reflector port, said primary port having an input node for receiving radio frequency signals from an amplifier and said primary port also having an output node coupled to an antenna port;

a rectification circuit having an input coupled to said reflector port;

a low pass filter coupled to an output of said rectification circuit; and a comparator having a reference input, a signal input and comparator output, said reference input being set to a voltage threshold level and said signal input being coupled to an output of said low pass filter, wherein in use signals at said comparator output are indicative of a missing or mismatched antenna coupled to said antenna port.

2. A detector circuit as claimed in claim 1, wherein said rectification circuit includes a direct current amplifier.

3. A detector circuit as claimed in claim 2, wherein said rectification circuit comprises at least two diodes and at least two capacitors, one of said capacitors being in series with said diodes and the other of said capacitors being coupled to ground.

4. A detector circuit as claimed in claim 3, wherein said rectification circuit is a voltage doubler.

5. A detector circuit as claimed in claim 1, wherein said comparator output is coupled to a controller.

6. A detector circuit as claimed in claim 5, wherein said controller has an amplifier control output for controlling said amplifier, and wherein said amplifier control output disables said amplifier when a signal indicative of antenna mismatch is provided at the output of said comparator.

7. A method for detecting antenna mismatch, the method comprising the steps of:

supplying alternating current signals from a reflector port of a coupler, said coupler having a primary port with an input node coupled to an amplifier and said primary port also having an output node coupled to an antenna port;

rectifying said alternating current signals to provide a rectified signal;

low pass filtering said rectified signal to provide a direct current voltage; and comparing a voltage level of said direct current voltage with voltage threshold level to provide a signal indicative of a missing or mismatched antenna coupled to said antenna port.

8. A method for detecting antenna mismatch as claimed in claim 7, wherein said step of rectifying further includes the step of amplifying said rectified signal.

9. A method for detecting antenna mismatch as claimed in claim 8, wherein said method is further characterised by the step of:

disabling said amplifier when a signal indicative of antenna mismatch is provided.

10. A method for detecting antenna mismatch as claimed in claim 7, wherein said method is further characterised by the step of:

disabling said amplifier when a signal indicative of antenna mismatch is provided.

* * * * *